US012043026B2

(12) United States Patent
Nakano

(10) Patent No.: US 12,043,026 B2
(45) Date of Patent: Jul. 23, 2024

(54) IMAGE FORMING APPARATUS

(71) Applicant: KYOCERA Document Solutions Inc., Osaka (JP)

(72) Inventor: Jun Nakano, Osaka (JP)

(73) Assignee: Kyocera Document Solutions, Inc. (JP)

( * ) Notice: Subject to any disclaimer, the term of this patent is extended or adjusted under 35 U.S.C. 154(b) by 163 days.

(21) Appl. No.: 17/949,827

(22) Filed: Sep. 21, 2022

(65) Prior Publication Data

US 2023/0098337 A1 Mar. 30, 2023

(30) Foreign Application Priority Data

Sep. 28, 2021 (JP) ................................ 2021-157556

(51) Int. Cl.

*B41J 29/393* (2006.01)
*B41J 2/045* (2006.01)
*B41J 2/21* (2006.01)

(52) U.S. Cl.

CPC ....... *B41J 2/04505* (2013.01); *B41J 2/04535* (2013.01); *B41J 2/0456* (2013.01); *B41J 2/2139* (2013.01); *B41J 2/2142* (2013.01); *B41J 29/393* (2013.01)

(58) Field of Classification Search

CPC ....... B41J 2/2139; B41J 2/2142; B41J 29/393
See application file for complete search history.

(56) References Cited

U.S. PATENT DOCUMENTS

2006/0092211 A1 5/2006 Arakawa et al.

FOREIGN PATENT DOCUMENTS

JP 2006-142807 6/2006

*Primary Examiner* — Julian D Huffman

(57) ABSTRACT

In image forming apparatus, a control unit determines nozzles corresponding to the image to be printed, correspondingly to a position of a print sheet, and causes a recording head to eject ink from the nozzles. A correction processing unit performs a correction process corresponding to each of plural ink ejection malfunction positions in the image. If the number of the ink ejection malfunction positions detected with a predetermined ink droplet size exceeds a predetermined upperlimit value, the correction processing unit prints a test pattern using the control unit with an ink droplet size larger than the predetermined ink droplet size, determines as a preferential ink ejection malfunction position an ink ejection malfunction position that ink ejection malfunction is also detected in the test pattern on the basis of a scanned image of the test pattern, and preferentially performs the correction process for the preferential ink ejection malfunction position.

4 Claims, 6 Drawing Sheets

IMAGE FORMING APPARATUS

CROSS-REFERENCE TO RELATED APPLICATIONS

This application relates to and claims priority rights from Japanese Patent Application No. 2021-157556, filed on Sep. 28, 2021, the entire disclosures of which are hereby incorporated by reference herein.

BACKGROUND

1. Field of the Present Disclosure

The present disclosure relates to an image forming apparatus.

2. Description of the Related Art

An inkjet-type image forming apparatus detects a malfunction nozzle that becomes unable to properly eject ink, among nozzles that eject ink in a recording head, and changes an ink ejection amount for an adjacent dot on the basis of an occurrence status of the malfunction nozzle.

When printing on a cut sheet, a nozzle used to depict each pixel in an image to be printed is differently determined sheet by sheet on the basis of a sheet transportation condition and correspondingly to a position (i.e. a position in a direction perpendicular to a transportation direction) of an incoming sheet in transportation. As mentioned, if the ink ejection amount is corrected due to the malfunction nozzle, then in a short time from determination of the sheet position to ink ejection, it is required to determine a pixel corresponding to the malfunction nozzle in the image to be printed and to perform a correction process for a periphery of the determined pixel.

Therefore, if many ink ejection malfunction positions appear to be corrected, the aforementioned correction process can not be completed in the short time. Although such many ink ejection malfunction positions can be corrected by performing the correction process using high-speed hardware, such high-speed hardware results in a high cost of the apparatus.

SUMMARY

An image forming apparatus according to an aspect of the present disclosure includes a recording head, a control unit, and a correction processing unit. The recording head is configured to eject ink corresponding to an image to be printed, using arranged nozzles. The control unit is configured to determine nozzles corresponding to the image to be printed, correspondingly to a position of a print sheet, and cause the recording head to eject ink from the nozzles. The correction processing unit is configured to perform a correction process corresponding to each of plural ink ejection malfunction positions in the image. Further, if the number of the ink ejection malfunction positions detected with a predetermined ink droplet size exceeds a predetermined upper-limit value, the correction processing unit (a) prints a test pattern using the control unit with an ink droplet size larger than the predetermined ink droplet size, (b) determines as a preferential ink ejection malfunction position an ink ejection malfunction position that ink ejection malfunction is also detected in the test pattern among the ink ejection malfunction positions on the basis of a scanned image of the test pattern, and (c) preferentially performs the correction process for the preferential ink ejection malfunction position.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
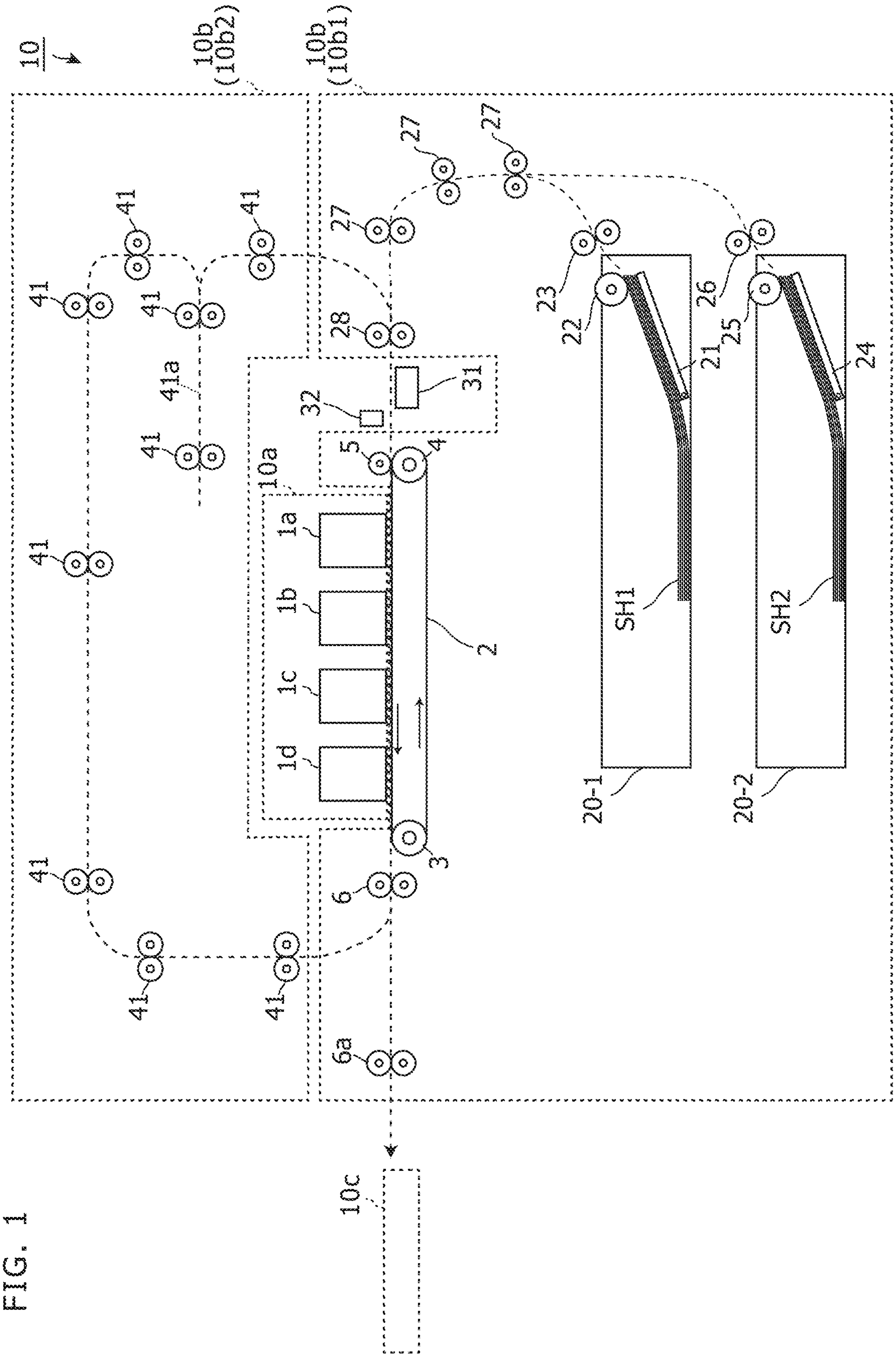
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10*a* and a sheet transportation unit 10*b*. The print engine 10*a* physically forms an image to be printed on a print sheet (print paper sheet or the like). In this embodiment, the print engine 10*a* is a line-type inkjet print engine.

In this embodiment, the print engine 10*a* includes line-type head units 1*a* to 1*d* corresponding to four ink colors: Cyan, Magenta, Yellow, and Black.

Figure 2:
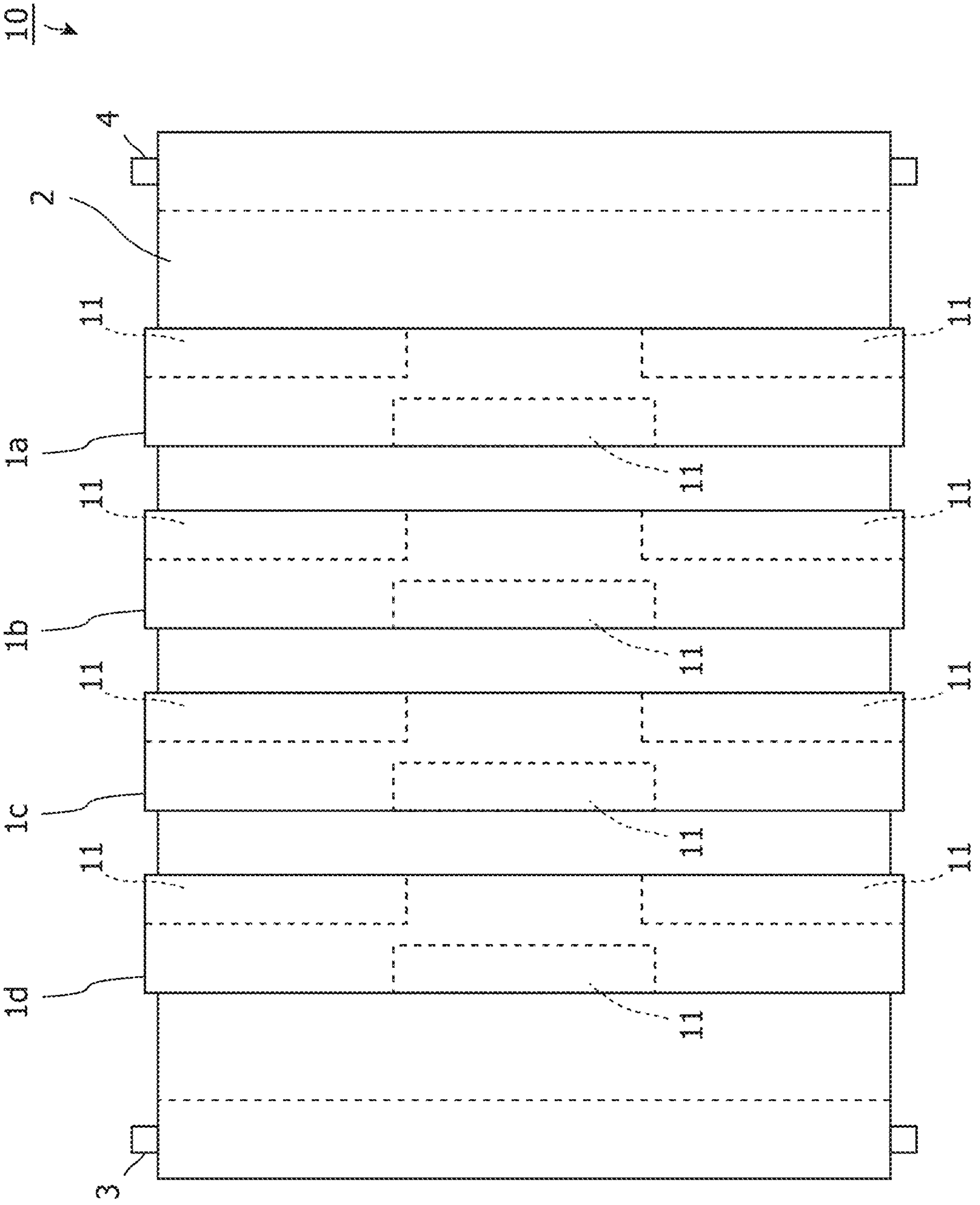
FIG. 2 shows a plane view of an example of recording heads 1*a* to 1*d* in the image forming apparatus 10 shown in FIG. 1.

FIG. 2 shows a plane view of an example of recording heads 1*a* to 1*d* in the image forming apparatus 10 shown in FIG. 1. As shown in FIG. 2, for example, in this embodiment, each of the inkjet recording units 1*a*, 1*b*, 1*c* and 1*d* includes plural (here, three) head units 11. The head units 11 are arranged along a primary scanning direction, and are capable of being mounted to and demounted from a main body of the image forming apparatus. Each of the inkjet recording units 1*a*, 1*b*, 1*c* and 1*d* may include only one head unit 11. The head unit 11 of the inkjet recording unit 1*a*, 1*b*, 1*c* or 1*d* includes 2-dimensionally arranged nozzles, and ejects ink corresponding to the image to be printed using the nozzles.

The sheet transportation unit 10*b* transports the print sheet to the print engine 10*a* along a predetermined transportation path, and transports the print sheet after printing from the print engine 10*a* to a predetermined output destination (here, an output tray 10*c* or the like).

The sheet transportation unit 10*b* includes a main sheet transportation unit 10*b*1 and a circulation sheet transportation unit 10*b*2. In duplex printing, the main sheet transportation unit **10*b*1 transports to the print engine 10*a* a print sheet to be used for printing of a first-surface page image, and the circulation sheet transportation unit 10*b*2 transports the print sheet from a posterior stage of the print engine 10*a* to a prior stage of the print engine 10*a*** with detaining a predetermined number of print sheets.

In this embodiment, the main sheet transportation unit **10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a***.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units **1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c*** or the like.

Further, the main sheet transportation unit **10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2**.

When performing duplex printing, the circulation sheet transportation unit **10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a*** among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side end edges) of the print sheet. For example, the line sensor 31 is a CIS (Contact Image Sensor). In this embodiment, the line sensor 31 is arranged at a position between the registration roller 28 and the print engine **10*a***.

The sheet detecting sensor 32 is an optical sensor that detects that a top end of the print sheet SH1 or SH2 passes through a predetermined position on the transportation path. The line sensor 31 detects the positions of the both side end edges at a time point that the top end of the print sheet SH1 or SH2 is detected by the sheet detecting sensor 32.

For example, as shown in FIG. 1, the print engine **10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31** with changing an orientation of the print sheet in a switch back manner.

Figure 3:
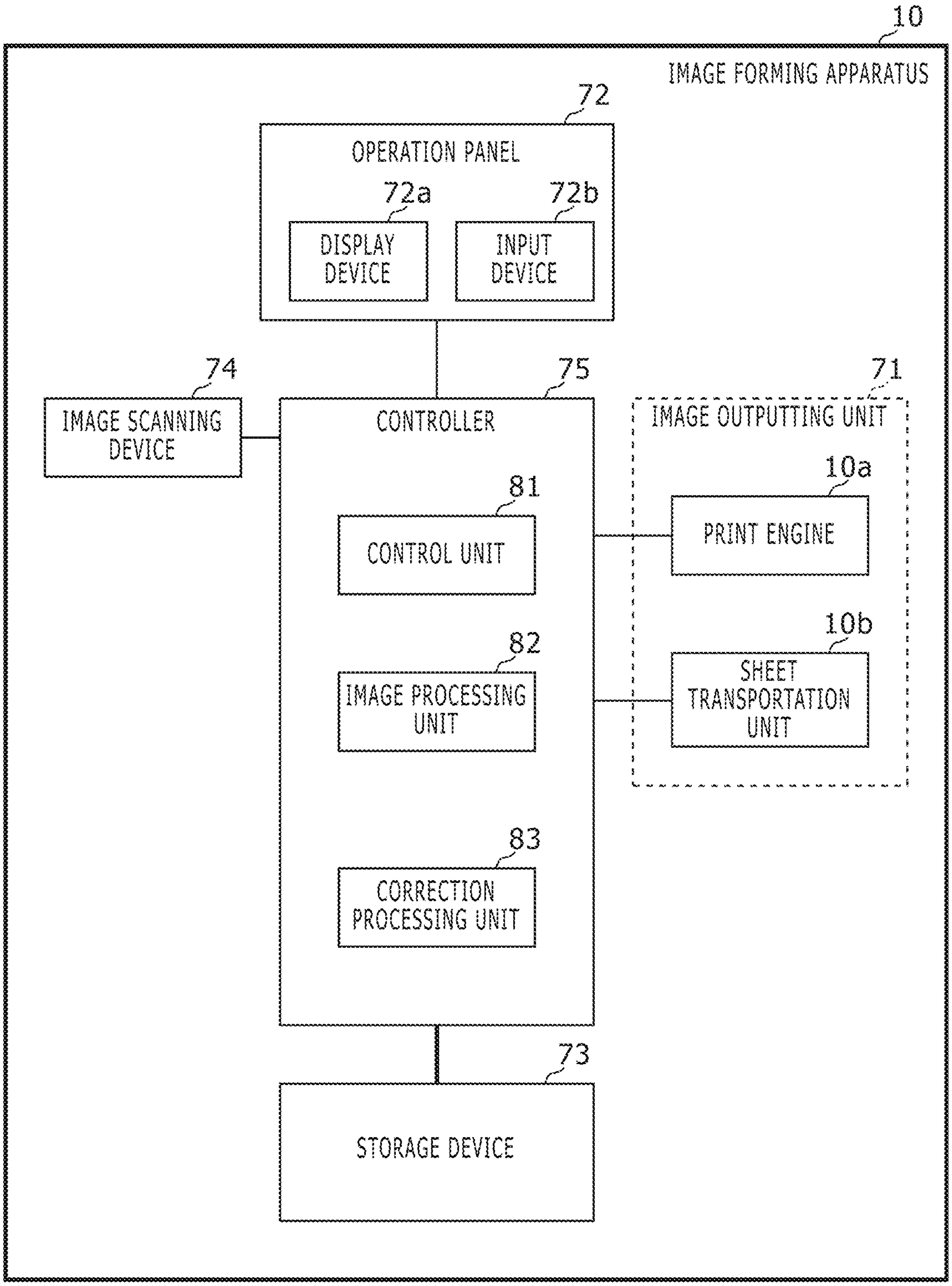
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device **72*a* such as a liquid crystal display and an input device 72*b* such as a hard key and/or touch panel, and displays sorts of messages for a user using the display device 72*a* and receives a user operation using the input device 72*b***.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, and a correction processing unit 83.

The control unit 81 controls the image outputting unit 71 (the print engine **10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82** performs a predetermined image process such as RIP (Raster Image Processing), color conversion, halftoning and/or the like for image data of a printing image.

Specifically, the control unit 81 causes the print engine **10*a*** to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Specifically, in the automatic centering function, the control unit 81 changes a depicting position of the image to be printed, in a primary scanning direction by a difference between a reference center position of the print engine 10*a* and the actual sheet center position. In this embodiment, because the nozzles of the recording heads 1*a* to 1*d* do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1*a* to 1*d* to eject ink from the determined nozzles.

The correction processing unit 83 performs as a hardware process the correction process corresponding to each of the plural ink ejection malfunction positions in the image to be printed. In this correction process, for example, image data (a pixel value) of a pixel adjacent to the ink ejection malfunction position is corrected such that a density of this adjacent pixel gets higher.

Specifically, if the number of the ink ejection malfunction positions detected with a predetermined ink droplet size exceeds a predetermined upperlimit value, the correction processing unit 83 (a) prints a test pattern using the control unit 81 with an ink droplet size larger than the predetermined ink droplet size, (b) determines as a preferential ink ejection malfunction position an ink ejection malfunction position that ink ejection malfunction is also detected in the test pattern among the ink ejection malfunction positions on the basis of a scanned image of the test pattern. In this embodiment, among the original ink ejection malfunction positions, the correction processing unit 83 performs the correction process for the preferential ink ejection malfunction positions, and does not perform the correction process for any other ink ejection malfunction positions than the preferential ink ejection malfunction positions. It should be noted that the test pattern is a band-shaped solid image along the primary scanning direction.

Figure 4:
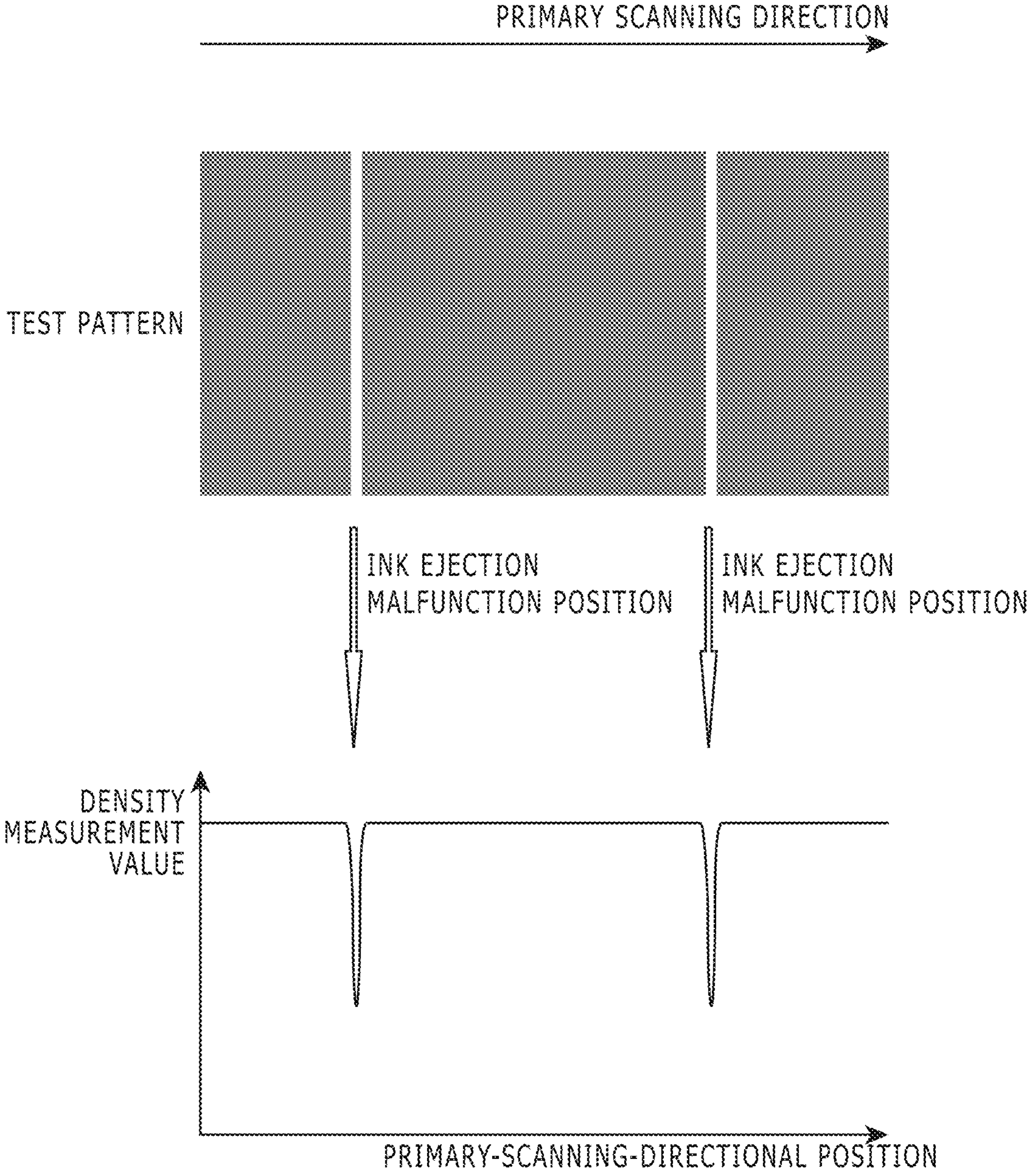
FIG. 4 shows a diagram that explains detection of an ink ejection malfunction position based on a density distribution of a test pattern image.

FIG. 4 shows a diagram that explains detection of an ink ejection malfunction position based on a density distribution of a test pattern image. In this embodiment, because the line sensor 31 is installed to detect a position of a print sheet, for example, the test pattern is printed with a predetermined ink droplet size on the print sheet, the circulation transportation unit 10*b*2 transports the print sheet, the line sensor 31 scans an image of the printed test pattern, and the ink ejection malfunction position is detected on the basis of a primary-scanning-directional density distribution of this image. For example, as shown in FIG. 4, a position of a dip in the density distribution is detected as the ink ejection malfunction position.

Figure 5:
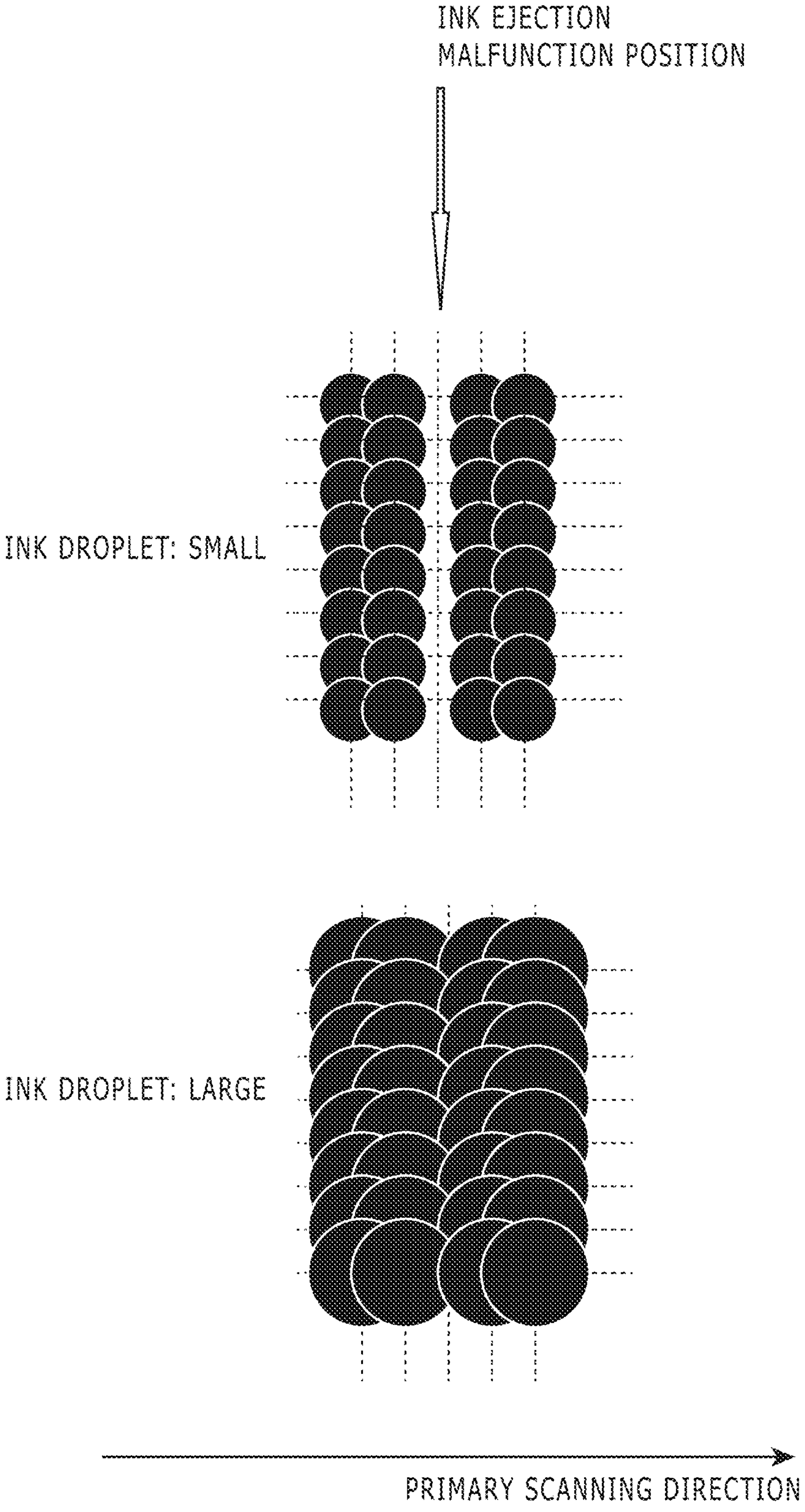
FIG. 5 shows a diagram that explains changes of an ink ejection malfunction position detected correspondingly to ink droplet sizes.

FIG. 5 shows a diagram that explains changes of an ink ejection malfunction position detected correspondingly to ink droplet sizes. If the number of the ink ejection malfunction positions with a predetermined ink droplet size exceeds a predetermined upperlimit value, then ink ejection malfunction positions are detected as well, with an ink droplet size larger than the predetermined ink droplet size. As shown in FIG. 5, since minor ink ejection malfunction in the density distribution tends not to be detected due to an ink droplet from a nozzle adjacent to an ink ejection malfunction nozzle, the number of ink ejection malfunction positions with the ink droplet size larger than the predetermined ink droplet size gets less than the number of ink ejection malfunction positions with the predetermined ink droplet size; and therefore, ink ejection malfunction positions for which the correction process is performed is limited to the ink ejection malfunction positions with the larger ink droplet size and thereby the correction process can be performed within the aforementioned short time.

If the line sensor 31 is used for the detection of the ink ejection malfunction position as mentioned, the ink ejection malfunction position is automatically detected, and thereafter the print sheet on which the test pattern has been printed is outputted. Instead of the line sensor 31, the print sheet on which the test pattern has been printed may be immediately outputted and set on the image scanning device 74 by a user, and the image on the print sheet may be scanned by the image scanning device 74.

The following part explains a behavior of the image forming apparatus 10.

Figure 6:
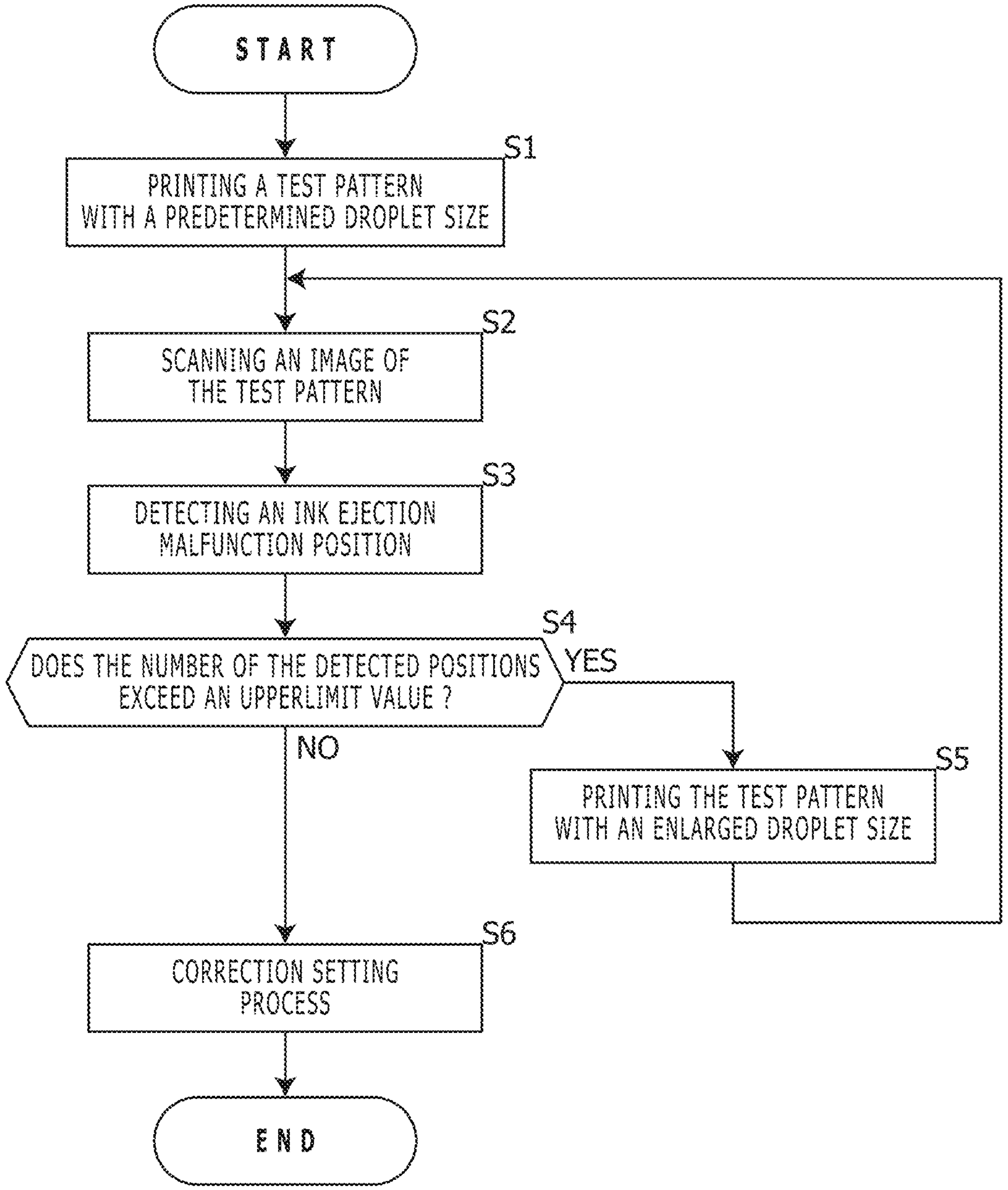
FIG. 6 shows a flowchart that explains a behavior of the image forming apparatus 10 shown in FIGS. 1 and 2.

(a) Determination of an Ink Ejection Malfunction Position that the Correction Process should be Performed FIG. 6 shows a flowchart that explains a behavior of the image forming apparatus 10 shown in FIGS. 1 and 2.

The correction processing unit 83 causes the image outputting unit 71 to print a test pattern with a predetermined ink droplet size on a print sheet (in Step S1).

The correction processing unit 83 acquires a scanned image (i.e. image data of each ink color) of the test pattern using the line sensor 31 or the image scanning device 74 as mentioned (in Step S2).

The correction processing unit 83 detects an ink ejection malfunction position on the basis of a density distribution of the scanned image in the primary scanning direction, and determines a nozzle corresponding to the ink ejection malfunction position (in Step S3).

Subsequently, the correction processing unit 83 determines whether the number of the detected ink ejection malfunction positions exceeds an upperlimit value (a limit number of the ink ejection malfunction positions for which the correction process is performed in the aforementioned short time) or not (in Step S4).

If the number of the detected ink ejection malfunction positions exceeds the upperlimit value, then the correction processing unit 83 causes the image outputting unit 71 to print the test pattern with an ink droplet size larger than the predetermined ink droplet size on a print sheet (in Step S5). Subsequently, the correction processing unit 83 performs acquisition of the scanned image and determination of ink ejection malfunction positions and corresponding nozzles for the test pattern with the larger ink droplet size (in Steps S2 and S3), and determines whether the number of the detected ink ejection malfunction positions exceeds the aforementioned upperlimit value or not (in Step S4). In this case, if the number of the detected ink ejection malfunction positions exceeds the aforementioned upperlimit value, then the same process is performed for the test pattern with a more larger ink droplet size.

Otherwise, if the number of the detected ink ejection malfunction positions does not exceed the aforementioned upperlimit value, then the correction processing unit 83 determines as targets of the correction process the currently detected ink ejection malfunction position(s), and stores data of the ink ejection malfunction position(s) and ink ejection malfunction nozzle(s) into the storage device 73.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this process, the correction processing unit 83 reads the data of the ink ejection malfunction positions and the ink ejection malfunction nozzles from the storage device 73 and determines the ink ejection malfunction positions and the ink ejection malfunction nozzles before starting the printing; and upon detecting a position of a print sheet using the line sensor 31, the correction processing unit 83 (a) determines a nozzle corresponding to each pixel in the aforementioned image, (b) determines the ink ejection malfunction positions in the aforementioned image (i.e. corresponding nozzles), and (c) performs the correction process for the ink ejection malfunction positions. Subsequently, the control unit 81 performs the aforementioned printing on the basis of the image data after the correction process.

As mentioned, in the aforementioned embodiment, the recording head 1*a*, 1*b*, 1*c* or 1*d* ejects ink corresponding to an image to be printed, using arranged nozzles. The control unit 81 determines nozzles corresponding to the image to be printed, correspondingly to a position of a print sheet, and causes the recording head 1*a*, 1*b*, 1*c* or 1*d* to eject ink from the nozzles. The correction processing unit 83 performs a correction process corresponding to each of the plural ink ejection malfunction positions in the aforementioned image. Further, if the number of the ink ejection malfunction positions detected with a predetermined ink droplet size exceeds a predetermined upperlimit value, the correction processing unit 83 (a) prints a test pattern using the control unit 81 with an ink droplet size larger than the predetermined ink droplet size, (b) determines as a preferential ink ejection malfunction position an ink ejection malfunction position that ink ejection malfunction is also detected in the test pattern among the ink ejection malfunction positions on the basis of a scanned image of the test pattern, and (c) preferentially performs the correction process for the preferential ink ejection malfunction position.

Consequently, the correction process is omitted for minor ink ejection malfunction when many ink ejection malfunctions appear and the correction process corresponding to ink ejection malfunction is effectively performed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if the number of the ink ejection malfunction positions exceeds the upperlimit value, the correction processing unit 83 may print plural test patterns with plural ink droplet sizes on a single print sheet and determine as targets of the correction process ink ejection malfunction positions of a test pattern of which the number of ink ejection malfunction positions is largest among one or more test patterns of which the number of ink ejection malfunction positions is equal to or less than the upperlimit value among the plural test patterns.

What is claimed is:

1. An image forming apparatus, comprising:

a recording head configured to eject ink corresponding to an image to be printed, using arranged nozzles;

a control unit configured to determine nozzles corresponding to the image to be printed, correspondingly to a position of a print sheet, and cause the recording head to eject ink from the nozzles; and a correction processing unit configured to perform a correction process corresponding to each of plural ink ejection malfunction positions in the image;

wherein if the number of the ink ejection malfunction positions detected with a predetermined ink droplet size exceeds a predetermined upperlimit value, the correction processing unit (a) prints a test pattern using the control unit with an ink droplet size larger than the predetermined ink droplet size, (b) determines as a preferential ink ejection malfunction position an ink ejection malfunction position that ink ejection malfunction is also detected in the test pattern among the ink ejection malfunction positions on the basis of a scanned image of the test pattern, and (c) preferentially performs the correction process for the preferential ink ejection malfunction position.

2. The image forming apparatus according to claim 1, wherein the correction processing unit performs the correction process for the preferential ink ejection malfunction positions, and does not perform the correction process for any other ink ejection malfunction positions other than the preferential ink ejection malfunction positions.

3. The image forming apparatus according to claim 1, wherein the correction processing unit performs the correction process as a hardware process.

4. The image forming apparatus according to claim 1, further comprising a line sensor configured to detect a position of the print sheet;

wherein the line sensor generates the scanned image of the test pattern.

* * * * *